United States Patent [19]

Fisher et al.

[11] 4,031,761
[45] * June 28, 1977

[54] ENGINE POWER TAKE-OFF SYSTEM WITH SINGLE BELT DRIVE

[75] Inventors: David G. Fisher; Robert G. Gladden, both of Springfield, Mo.

[73] Assignee: Dayco Corporation, Dayton, Ohio

[ * ] Notice: The portion of the term of this patent subsequent to Apr. 20, 1993, has been disclaimed.

[22] Filed: Apr. 16, 1976

[21] Appl. No.: 677,860

Related U.S. Application Data

[63] Continuation of Ser. No. 551,477, Feb. 20, 1975, Pat. No. 3,951,006, which is a continuation of Ser. No. 390,448, Aug. 22, 1973, abandoned.

[52] U.S. Cl. .................. 74/15.63; 74/219; 74/221; 74/227; 74/229; 123/41.46; 74/231 R; 74/233; 74/234

[51] Int. Cl.² .................. F16H 7/02; F16G 5/08; F16G 5/20

[58] Field of Search .......... 74/231 R, 233, 234, 74/237, 219, 221, 229, 242.11, 15.63, 15.6, 216.5, 227; 123/41.46, 198 R

[56] References Cited

UNITED STATES PATENTS

| | | | |
|---|---|---|---|
| 2,508,756 | 5/1950 | Jackobice | 74/219 |
| 2,728,239 | 12/1955 | Adams, Jr. | 74/229 |
| 3,361,000 | 1/1968 | Buchwald | 74/219 |
| 3,380,313 | 4/1968 | Bulin | 74/227 |
| 3,383,933 | 5/1968 | Shultz et al. | 74/227 |
| 3,483,763 | 12/1969 | Enters | 74/15.63 |
| 3,603,296 | 9/1971 | Mitchell | 123/41.46 |
| 3,613,645 | 10/1971 | Froumajou | 123/41.46 |
| 3,643,518 | 2/1972 | Semin et al. | 74/234 |

Primary Examiner—Samuel Scott
Assistant Examiner—Allan R. Burke
Attorney, Agent, or Firm—Reuben Wolk

[57] ABSTRACT

A drive system is provided which comprises a single endless power transmission belt which has opposed driving portions defined by a flat driving portion and an oppositely arranged driving portion which has a plurality of projections therein and wherein such belt operatively associates with a driving sheave and a plurality of driven sheaves with the driving sheave and at least one of the driven sheaves each having a plurality of grooves therein each defined by an associated channel-like surface when viewed in cross section and at least another of the driven sheaves having a right circular cylindrical surface whereupon the flat driving portion of the belt operatively engages the right circular cylindrical surface and the projections of the oppositely arranged driving portion are received in grooves of the grooved sheaves and operatively engage the channel-like surfaces. A belt tensioning device is also provided and maintains a controlled tension on the belt during operation thereof.

5 Claims, 10 Drawing Figures

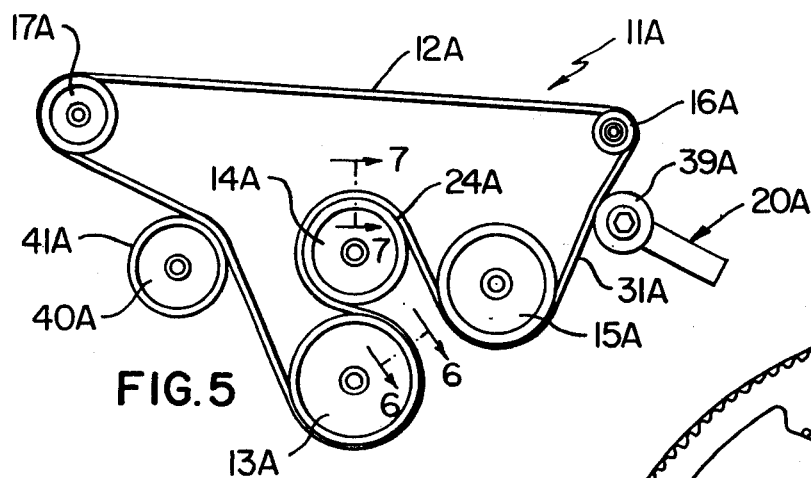
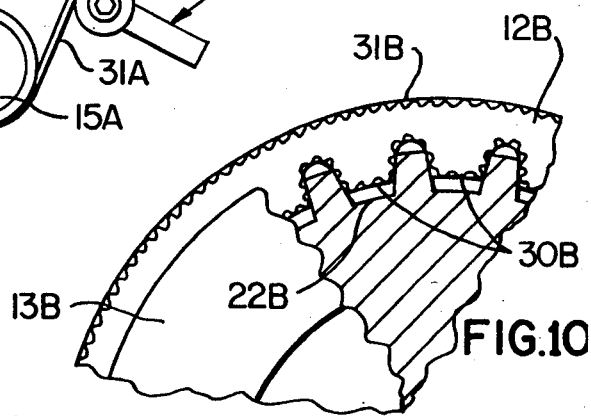
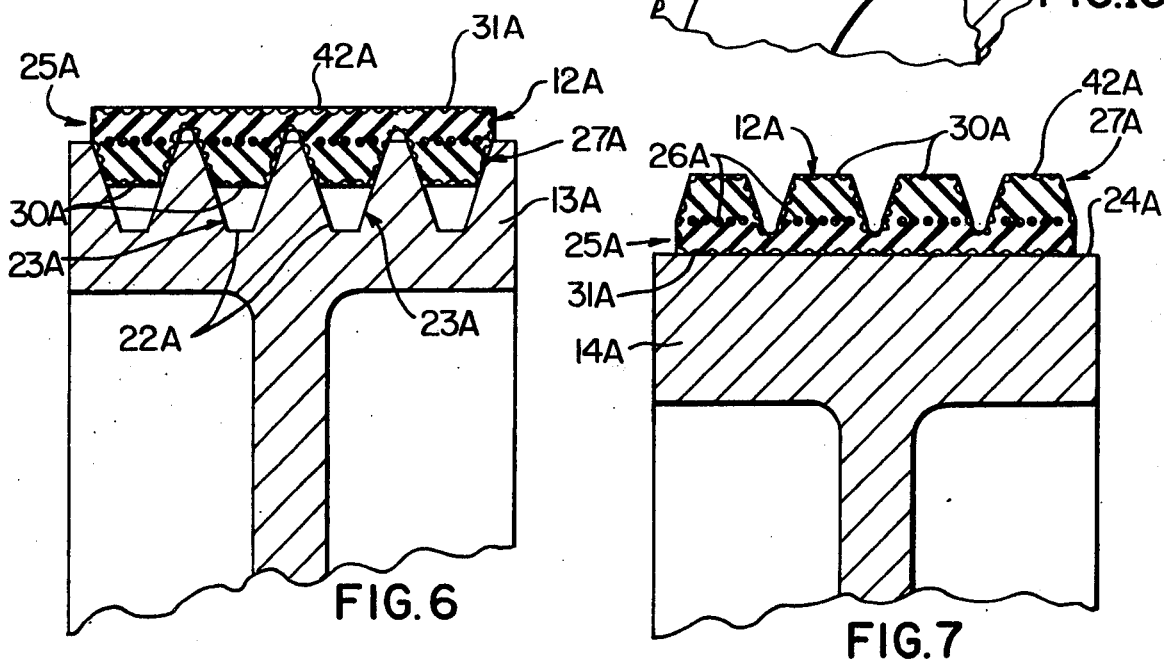
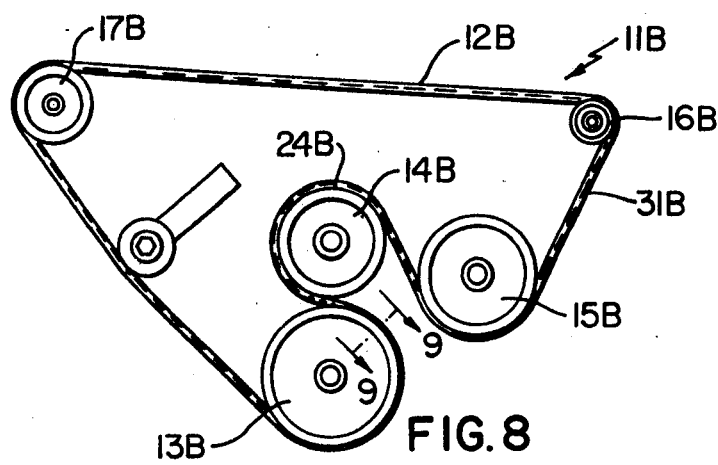
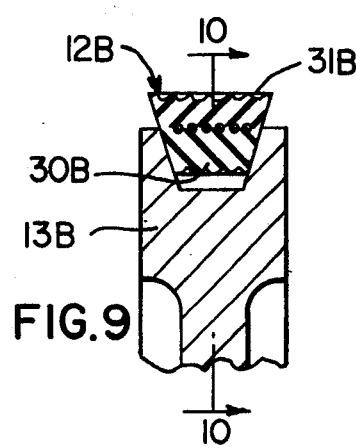

4,031,761

ENGINE POWER TAKE-OFF SYSTEM WITH SINGLE BELT DRIVE

This is a continuation of application Ser. No. 551,477, filed Feb. 20, 1975, now U.S. Pat. No. 3,951,006; which in turn is a continuation of Ser. No. 390,448, filed Aug. 22, 1973, now abandoned.

BACKGROUND OF THE INVENTION

Belt drive assemblies utilizing power transmission belts capable of driving from opposite sides or portions thereof have been proposed heretofore; however, in general, these previously proposed belts employ comparatively complex structures in each of their oppositely arranged driving portions thereby complicating each of these driving belts unnecessarily and inherently increasing the cost of manufacturing such belts and the cost of the sheaves required for these belts. In addition, these previously proposed belts due to their complex driving portions are quite thick whereby substantial stresses are created in each of these belts during operation and these stresses invariably result in a reduction in the operating life of the belts.

SUMMARY

This invention provides a simple and economical drive system which employs a single endless power transmission belt of minimum thickness yet which is capable of operating for a comparatively long service life even over comparatively small diameter sheaves. The drive system uses a single endless power transmission belt which has opposed driving portions defined by a flat driving portion and an oppositely arranged driving portion which has a plurality of projections therein and wherein such belt operatively associates with a driving sheave and a plurality of driven sheaves with the driving sheave and at least one of the driven sheaves each having a plurality of grooves therein each defined by an associated channel-like surface when viewed in cross section and at least another of the driven sheaves having a right circular cylindrical surface whereupon the flat driving portion of the belt operatively engages the right circular cylindrical surface and the projections of the oppositely arranged driving portion are received in grooves of the grooved sheaves and operatively engage the channel-like surfaces. A belt tensioning device is also provided and maintains a controlled tension on the belt during operation thereof.

Other details, uses, and advantages of this invention will be readily apparent from the exemplary embodiments thereof presented in the following specification, claims, and drawings.

BRIEF DESCRIPTION OF THE DRWINGS

The accompanying drawings show present preferred embodiments of this invention in which, FIG. 1 is a perspective view illustrating one exemplary embodiment of the drive system of this invention used on an automobile engine;

FIG. 5 is a view similar to FIG. 2 illustrating another exemplary embodiment of the drive system of this invention comprising another embodiment of an endless power transmission belt together with its associated sheaves and belt tensioning device;

FIG. 6 is an enlarged fragmentary cross-sectional view taken essentially on the line 6—6 of FIG. 5;

FIG. 7 is an enlarged fragmentary cross-sectional view taken essentially on the line 7—7 of FIG. 5;

FIG. 8 is a view similar to FIG. 2 illustrating another exemplary embodiment of the drive system of this invention comprising another embodiment of an endless power transmission belt together with its associated sheaves and belt tensioning device;

FIG. 9 is an enlarged fragmentary cross-sectional view taken essentially on the line 9—9 of FIG. 8; and FIG. 10 is an enlarged fragmentary cross-sectional view taken substantially on the line 10—10 of FIG. 9.

DETAILED DESCRIPTION

Figure 1:
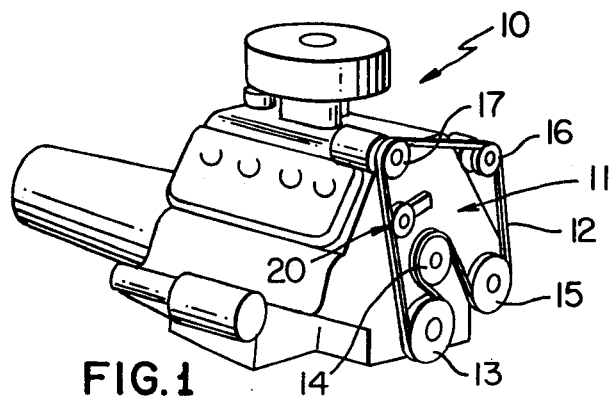

Reference is now made to FIG. 1 of the drawings which illustrates a prime mover or engine in the form of an automobile engine 10 which utilizes one exemplary embodiment of an improved endless power transmission belt drive system of this invention which is designated generally by the reference numeral 11. The drive system 11 employs a plurality of belt pulleys or sheaves having configurations and diameters as determined by their associated engine component and locations relative to each other and a single endless power transmission belt 12. The sheaves are suitable supported on the engine 10 and operatively connected to their associated components in any manner well known in the art and preferably so that the belt 12 operates in one plane which in this example is a vertical plane.

Figure 2:
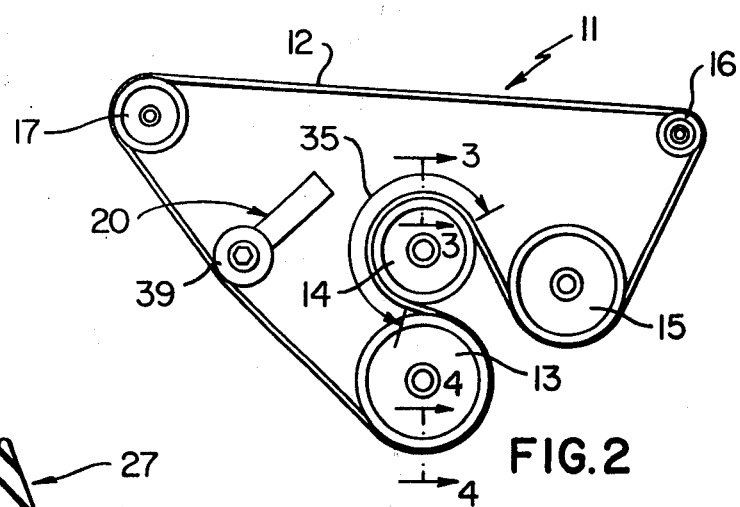
FIG. 2 is a view looking toward the front of the engine of FIG. 1 and particularly illustrating an endless power transmission belt, sheaves, and belt tensioning device which comprise the drive system of FIG. 1.

As seen in FIGS. 1 and 2, the drive system 11 employs a driving sheave 13 which is operatively connected to the main drive shaft of the engine 10, a sheave 14 which is operatively connected to a water pump for the engine 10, a sheave 15 which is operatively connected to a power steering unit for an associated automobile (not shown) using the engine 10, a sheave 16 operatively connected to an alternator which provides electrical power for the engine 10, and a sheave 17 operatively connected to a mechanical power supplying unit for an air conditioning system used on the above-mentioned automobile which employs the engine 10. Accordingly, the sheave 13 is what will be referred to as a driving sheave which drives the remaining sheave 14, 15, 16 and 17 which in this example will be referred to as driven sheaves.

The drive system 11 utilizes a belt tensioning device which is designated generally by the reference numeral 20 and is provided for maintaining a controlled tension on the belt 12 to assure that such belt and the various sheaves operatively associated therewith will rotate substantially without slippage therebetween. The belt tensioning device 20 will be described in more detail subsequently.

Figure 3:
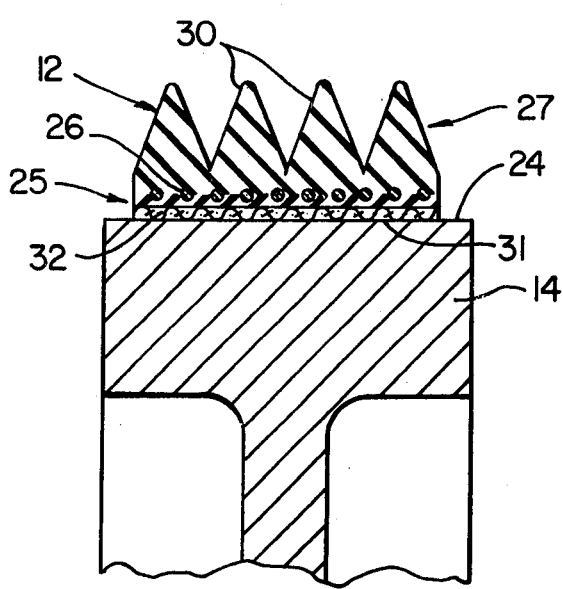
FIG. 3 is an enlarged fragmentary cross-sectional view taken essentially on the line 3—3 of FIG. 2.
Figure 4:
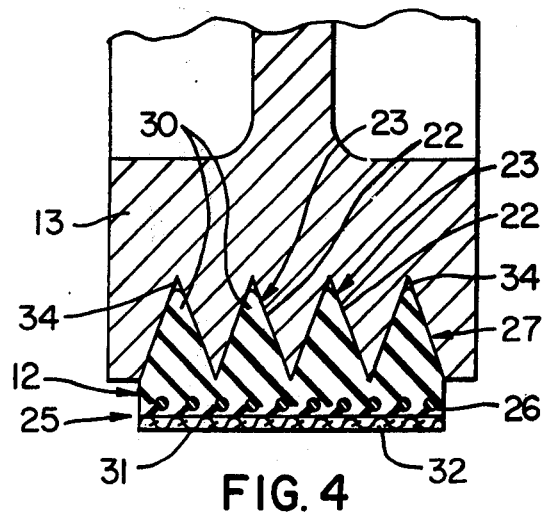
FIG. 4 is an enlarged fragmentary cross-sectional view taken essentially on the line 4—4 of FIG. 2.

The driving sheave 13 and the driven sheaves 15, 16, 17 each has a plurality of four typical circumferential grooves therein each identified by the same reference numeral 22, see FIG. 4 for the typical grooves in sheave 13, and each groove 22 is defined by an associated channel-like surface 23 which has a substantially V-shaped cross-sectional configuration. The driven sheave 14 has a right circular cylindrical outside surface 24, see FIG. 3, which is free of side retaining flanges, or the like.

The belt 12 comprises a tension section 25, a load-carrying section in the form of a spirally wound load carrying cord 26 which is made of a comparatively inextensible material, and a compression section 27 defined by a plurality of four longitudinally extending integral belt elements or projections each designated by the same reference numeral 30 and the projections or elements which will also be referred to as longitudinal ribs 30, have configurations which correspond substantially to the configurations of the circumferential grooves 22; and, as seen in the typical sheave 13 shown in FIG. 4, the four projections 30 are received within their associated four grooves 22.

The belt 12 has what will be referred to as a flat driving portion 31 defined by the outside surface of a fabric layer 32 which is integrally bonded to the elastomeric material defining the outer portion of the tension section 25 and the flat driving portion 31 operatively engages the right circular cylindrical surface 24 of the sheave 14. The belt 12 also has an oppositely arranged driving portion and the spaced longitudinal projections or ribs 30 comprising the compression section 27 define such oppositely arranged driving portion and it will be seen that the projections 30 operatively engage the driven sheave 15, 16 and 17 as well as the driving sheave 13.

As will be apparent from FIG. 3 of the drawings, each of the longitudinal ribs 30 has a substantially uniform V-shaped cross-sectional configuration and extends in a continuous uninterrupted manner along the full length of the belt. Each rib 30 is received within an associated groove 22 of each pulley associated therewith so that it does not completely fill its groove 22 but leaves an open volume 34 as indicated for a typical groove 22 and associated rib 30 in FIG. 4 of the drawings: however, it will be apparent that each rib provides a substantial contact area and acts as a frictional force multiplier providing high frictional grip per pound of belt tension. In addition, due to the manner in which the ribs 30 contact their associated sheave the load is distributed across the entire load-carrying member 26 of the belt 12.

The flat driving portion 31 of the belt 12 engages the right circular cylindrical surface 24 of the driven pulley 14 and as will be apparent from FIG. 2 the flat driving portion 31 engages surface 24 over a substantial arc indicated by the angle 35 which is greater than 180° whereby the sheave 14 is easily driven without slipping. In addition, it will be seen that the location of the center line of the sheave 14 with respect to the sheaves 13 and 15 assures that the desired wrap around or the desired angle of contact is provided between the belt 12 and sheave 13 and the belt 12 and sheave 15.

As will be readily apparent from FIG. 3 of the drawings, the belt 12 has a comparatively thin cross section and such cross section is much thinner than previously proposed belts which have comparatively complex driving portions arranged on opposite sides thereof. The thin cross section increases belt life by reducing hysteresis, reducing belt weight which reduces centrifugal tension loss, allows easy flexing over comparatively small pulleys, and allows so-called "backside" bending, i.e., the type of bending which allows wrapping of the flat driving portion 31 around the sheave 14.

It will also be appreciated that the utilization of cooperating circumferentially grooves pulleys which operate in a single plane together with the belt 12 allow the plain sheave 14 to be made free of side flanges yet precise contact, free of axial movement, is assured on the right circular cylindrical surface 24.

The drive system 11 employs the previously mentioned belt tensioning device 20 and such belt tensioning device utilizes a pulley 39 which is urged against the ribs 30 of the inside driving portion of the belt 12. The device 20 may be of any suitable construction to assure that the required amount of tension is provided on the belt 12 and such tension may be constant within a predetermined range or may be variable as a function of load.

For brevity of presentation the belt 12 is illustrated in FIG. 4 of the drawings in enlarged cross-sectional view with its ribs 30 in operative engagement with the sheave 13; however, it will be appreciated that the ribs 30 of belt 12 operatively engage the sheaves 15, 16 and 17 in a similar manner.

Another exemplary embodiment of the drive system of this invention is illustrated in FIGS. 5–7 of the drawings. The drive system illustrated in FIGS. 5–7 is very similar to the drive system 11; therefore, such drive system will be designated generally by the reference numeral 11A and component parts thereof which are similar to corresponding parts of the drive system 11 will be designated by the same reference numerals as in the drive system 11 also followed by the latter designation A and not described again in detail.

The drive system 11A is particularly adapted to be used on the engine 10 and in addition to the sheaves 13A, 14A, 15A, 16A and 17A has a sheave 40A which may comprise an anti-pollution device provided on the engine 10. The sheaves 13A, 14A, 15A, 16A and 17A each has a plurality of four circumferential grooves therein each designated by the same reference numeral 22A and each of these grooves has a substantially U-shaped cross-sectional configuration each defined by an associated U-shaped surface 23A in its associated sheave. The driven sheave 14A has a right circular cylindrical surface 24A, see FIG. 7, which is also free of side retaining flanges and the driven sheave 40A also has a right circular cylindrical outside surface 41A which is also free of side retaining flanges, or the like.

The belt 12A comprises a tension section 25A, a load-carrying section 26A which is defined by four spaced apart sections 26A of spirally wound load carrying cord, and a compression section 27A defined by a plurality of integral belt elements or projections each designated by the reference numeral 30A and each of the projections or elements 30A has a substantially trapezoidal cross-sectional configuration which corresponds to the configuration of each of the circumferential grooves 22A of the typical sheave 13A so that the elements which will also be referred to as ribs 30A are received within the circumferential grooves 22A in the manner illustrated in FIG. 5.

The belt 12A of this example is a completely covered belt and has a cover 42A which may be made in any suitable manner known in the art and such cover is preferably impregnated with the same elastomeric material used to make the belt and extends around the entire periphery of the belt; however, it will be appreciated that the belt 12A need not necessarily be completely covered, as shown.

The belt 12A has a flat driving portion 31A which is defined by an associated surface of the cover 42A and the flat driving portion 31A operatively engages the right circular cylindrical surface 24A of the sheave 14A and the right circular cylindrical surface 41A of the sheave 40A whereby the belt 12A drives both of these driven sheaves using its flat driving portion. The belt has an oppositely arranged driving portion defined by its longitudinal trapezoidal ribs 30A which operatively engage the driven sheaves 15A, 16A and 17A and the driving sheave 13A.

The drive 11A also utilizes a belt tensioning device 20A and such device has a pulley 39A which engages the belt 12A. In this example the arrangement of the device 20A is such that its pulley 39A engages the flat driving portion 31A of the belt 12A and provides the desired controlled tension in such belt.

As in the presentation of the drive system 11, only the driving sheave 13A is shown in enlarged cross section in the drawings in operative engagement with the trapezoidal ribs 22A thereof in associated grooves 22A; however, it is to be understood that the sheaves 15A, 16A and 17A have similar grooves 22A which receive the trapezoidal projections or ribs 30A of the belt 12A in a similar manner.

Another exemplary embodiment of the drive system of this invention is illustrated in FIGS. 8, 9 and 10 of the drawings. The drive system illustrated in FIGS. 8–10 is very similar to the drive system 11; therefore, such drive system will be designated by the reference numeral 113 and parts of the drive system 11B which are similar to corresponding parts of the drive system 11 will be designated by the same reference numerals as in the drive system 11 and also followed by the letter designation B and not described again in detail.

The drive system 11B may be utilized on the engine 10 and has a driving sheave 13B and a plurality of driven sheaves 14B, 15B, 16B and 17B. The drive system 11B uses a belt 12B which has a flat driving portion 31B and an oppositely arranged driving portion provided with spaced projections in the form of teeth 30B, see FIG. 10. Accordingly, the sheaves 13B, 15B, 16B and 17B are in the form of toothed sheaves and have grooves each designated by the reference numeral 22B; and, the grooves 22B are arranged circumferentially around each associated sheave and are particularly adapted to receive the teeth or projections 30B of the belt 12B. The belt 12B also has a flat driving portion 31B which is particularly adapted to engage the right circular cylindrical surface 24B of the sheave 14B in a similar manner as previously described in connection with the drive system 11 and its similar components.

The belts 12, 12A and 12B may be made of any suitable elastomeric material and each is made primarily of a suitable natural or synthetic rubber compound or a suitable plastic material in accordance with the techniques well known in the art. In addition, the load carrying member of each of these members may be made of any suitable non-extensible material which may be in the form of a cord or may be in any other suitable form known in the art.

In this disclosure of the invention, each of the belts 12, 12A and 12B with its opposed driving portions, including the flat driving portion, has been illustrated and described together with associated sheaves and it has been mentioned that the resulting drive system may be used on the automotive engine 10 and such engine is illustrated as a reciprocating engine. However, it is to be understood that the drive system of this invention using a single belt which extends in a serpentine path may be used on any type of automotive engine including rotary engines, for example. In addition, the drive system of this invention may be utilized on any type of prime mover.

While present exemplary embodiments of this invention, and methods of practicing the same, have been illustrated and described, it will be recognized that this invention may be otherwise variously embodied and practiced within the scope of the following claims.

What is claimed is:

1. An improved automotive belt drive system comprising:
    an automotive engine having a driving sheave coupled thereto for rotation;
    at least three accessory devices each having a driven sheave coupled thereto, wherein each drive sheave is adapted to supply power to its respective accessory device, said driving sheave and at least two of said driven sheaves each having a plurality of annular circumferential grooves therein, at least another of said driven sheaves having a cylindrical surface free of said grooves, and all of said driven sheaves being disposed in a common plane with said driving sheave; and,
    an endless power transmission belt disposed about said sheaves and defining a serpentine path in said common plane, said belt having a flat driving portion and an oppositely arranged driving portion provided with a plurality of spaced longitudinal projections, said flat driving portion operatively engaging said cylindrical surface of said other driven sheave through a substantial arc of at least about 180°, and said projections of said oppositely arranged driving portion being received in said grooves of said grooved sheaves, said belt having a comparatively thin cross section for increasing belt life by reducing hysteresis, for reducing belt weight which reduces centrifugal tension loss, for allowing easy flexing around said sheaves, and for allowing backside bending enabling easy engagement of said flat driving portion against said cylindrical surface through said substantial arc to assure the driven sheave having said cylindrical surface is driven in a non-slipping manner.

2. An improved automotive drive belt system as set forth in claim 1, wherein said driven sheave having said cylindrical surface is mounted in spaced vertical proximity to said driving sheave.

3. An improved automotive drive belt system as set forth in claim 1, further comprising a tensioning device mounted for engagement with said belt at a position along said planar serpentine path for maintaining a predetermined tension on said belt.

4. An improved automotive drive belt system as set forth in claim 1, further comprising a tensioning device including a pulley engaged with said belt at a position along said planar serpentine path and means operatively associated with said pulley for exerting a tensioning force on said belt which varies as a function of the load applied to said belt by said accessory devices.

5. An automotive belt drive for use with an automotive engine having a plurality of sheaves in generally planar alignment and including a driving sheave and a plurality of driven sheaves, said driving sheave and at least one of said driven sheaves each having a plurality of circumferential, parallel annular grooves therein, at least another of said driven sheaves having a right circular cylindrical surface, said belt drive being endless and constructed and arranged for operatively engaging said sheaves in an elongated serpentine path of travel, and having a flat driving portion on one major side thereof and an oppositely arranged driving portion provided with a plurality of spaced projections on the other major side thereof, said flat driving portion adapted to engage said right circular cylindrical surface through a substantial arc sufficient to effect a positive driving engagement therebetween of at least about 180 degrees, and said projections of said oppositely arranged driving portion adapted to be disposed in the grooves of said grooved sheaves, said projections of said oppositely arranged driving portion being in the form of a plurality of spaced longitudinal ribs extending along the length of the belt drive, each of said ribs being of substantially uniform cross section and extending in alignment along the full endless path thereof, said belt drive having a comparatively thin cross section which increases belt life by reducing hysteresis, reduces belt weight which reduces centrifugal tension loss, allows easy flexing around said sheaves, and allows backside bending enabling easy engagement of said flat driving portion against said right circular cylindrical surface through said substantial arc to assure the driven sheave which has said right circular cylindrical surface is driven in a non-slipping manner.

* * * * *

UNITED STATES PATENT OFFICE
CERTIFICATE OF CORRECTION

PATENT NO. : 4,031,761
DATED : June 28, 1977
INVENTOR(S) : David G. Fisher and Robert G. Gladden It is certified that error appears in the above-identified patent and that said Letters Patent are hereby corrected as shown below:

Col. 2, line 31, "suitable" should be -- suitably --

Col. 2, line 51, "sheave" should be -- sheaves --

Col. 5, line 28, "113" should be -- 11B --

Signed and Sealed this

Twenty-second Day of November 1977

[SEAL]

Attest:

RUTH C. MASON
Attesting Officer

LUTRELLE F. PARKER
Acting Commissioner of Patents and Trademarks